(12) United States Patent
Subramanyam

(10) Patent No.: US 9,499,445 B2
(45) Date of Patent: Nov. 22, 2016

(54) IRON-ESSENTIAL FOR FLORA AND FAUNA

(71) Applicant: Sundaresan Subramanyam, Chennai (IN)

(72) Inventor: Sundaresan Subramanyam, Chennai (IN)

( * ) Notice: Subject to any disclaimer, the term of this patent is extended or adjusted under 35 U.S.C. 154(b) by 0 days.

(21) Appl. No.: 14/426,882

(22) PCT Filed: Aug. 14, 2013

(86) PCT No.: PCT/IN2013/000498
§ 371 (c)(1),
(2) Date: Mar. 9, 2015

(87) PCT Pub. No.: WO2014/041555
PCT Pub. Date: Mar. 20, 2014

(65) Prior Publication Data
US 2015/0225303 A1 Aug. 13, 2015

(30) Foreign Application Priority Data
Sep. 12, 2012 (IN) .......................... 3790/CHE/2012

(51) Int. Cl.
*C05B 17/00* (2006.01)
*C05D 9/02* (2006.01)

(52) U.S. Cl.
CPC ................. *C05B 17/00* (2013.01); *C05D 9/02* (2013.01)

(58) Field of Classification Search
CPC .......... C05B 17/00; C05D 9/02; C05D 9/00; C05D 3/00; C05D 1/00; A01N 43/90; A01N 25/32; C05G 3/007; C05G 3/0005; C05F 11/02; C05C 3/00
See application file for complete search history.

(56) References Cited

U.S. PATENT DOCUMENTS 6,063,289 A * 5/2000 Failon ....................... C02F 5/14
210/699
2013/0192322 A1* 8/2013 Miller ..................... C05B 15/00
71/23

FOREIGN PATENT DOCUMENTS

CN           1020500676 A       5/2011

OTHER PUBLICATIONS

HEDP Trade Info [online] Jing Xin (China), Mar. 11, 2012, Download: http://jijing-chem.en.made-in-china.com/product/veMmtqZoMwhP/China-HEDP-1-HYDROXY-Ethylidene-1-1-Disphosphonic-Acid.html [Downloaded: Nov. 12, 2013].

(Continued)

*Primary Examiner* — Jennifer A Smith
(74) *Attorney, Agent, or Firm* — Innovation Capital Law Group, LLP; Vic Lin

(57) ABSTRACT

The present invention relates to a chelated fertilizer composition for enriching Iron and Phosphorus content in agriculture/horticulture crops and plants through foliar application. The fertilizer composition is prepared using compounds comprising chelating agents and Ferric Oxide ($Fe_2O_3$). The chelation of Fe by disodium salt of Hydroxy Ethylidene Di Phosphonic Acid ($Na_2$ HEDP) developed 17% to 18% Fe-HEDP and 31% Phosphorus pentoxide ($P_2O_5$). The final chelated fertilizer composition obtained is in powder form and is 100% water-soluble concentrate. The chelated fertilizer composition can be used to cure Iron and Phosphorus deficiency in crops and plants, increase yield with more Iron and Phosphorus content, thus reducing the risk of Iron and Phosphorus deficiency in humans.

2 Claims, 1 Drawing Sheet

(56) References Cited

OTHER PUBLICATIONS

HEDP: 1-Hydroxy Ethylidene-1, 1-Diphosphonic Acid. Trade Info [online] SHR, Jining City Shandong Province China, Mar. 3, 2012. Download: http://www.made-in-china.com/showroom/pbte-chemical/product-detailgbimMCpVZSYe/China-HEDP-1-Hydroxy-Ethylidene-1-1-Diphosphonic-Acid.html [Downloaded: Nov. 12, 2013].

International Search Report (mailing date Nov. 22, 2013) for International PCT Application PCT/IN2013/000498, filed Aug. 14, 2013.

Walworth, James, "Recognizing and treating iron deficiency in the home yard", The University of Arizona College of Agriculture and Life Sciences, Originally published: 2006. Download: http://cals.arizona.edu/pubs/garden/az1415.pdf [downloaded: Mar. 9, 2015]. p. 3.

* cited by examiner

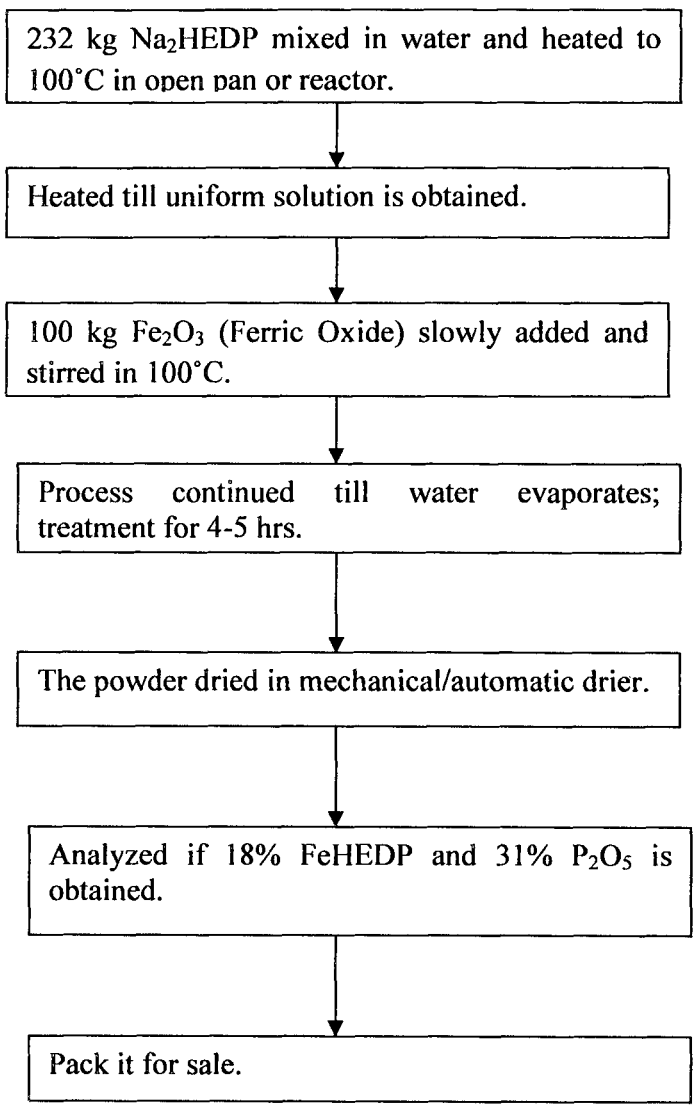

IRON-ESSENTIAL FOR FLORA AND FAUNA

FIELD OF INVENTION

The present invention relates to a chelated fertilizer composition for agriculture/horticulture crops and plants. More specifically, the present invention relates to a chelated fertilizer composition for enriching Iron and Phosphorus content in crops and plants through foliar application. Further, the present invention relates to a method of preparing the chelated fertilizer composition. The chelated fertilizer composition can be used to cure Iron and Phosphorus deficiency in crops and plants, increase yield with more Iron and Phosphorus content, thus reducing the risk of Iron and Phosphorus deficiency in humans.

DESCRIPTION OF PRIOR ART

Iron (Fe) helps in the proper growth of human body and helps to maintain good health. It is an essential protein component for metabolism. In humans, iron metabolism maintains homeostasis of iron. Iron is an essential component in the red blood cells. Iron is bound to proteins within the cell. Deficiency in iron leads to a condition called anemia. This condition is more prevalent in women.

Iron is an important element for plant growth and is required for cholorphyll formation as well as photosynthesis. Iron is used by enzymes to regulate transpiration in plants, which allows nutrients dissolved in water to reach all parts of the plants. Iron plays an essential role in nucleic acid metabolism—affect Ribo—Nucleic Acid (RNA), metabolism of chloroplasts. Iron is present at high quantities in soils, but its availability to plants is usually very low. In conditions, which may affect iron availability such as high levels of calcium, carbonate levels in the soil, high pH etc., and deficiency symptoms appear in plants. Deficiency of iron can lead to stunted growth, chlorosis i.e, yellowing of leaves, poor quality and quantity of fruits etc. Iron deficiency can be avoided by application of iron fertilizers. Iron fertilizers may be applied as ferrous sulfate ($FeSO_4$) or in a chelated form. Different chelates hold iron ions in different strengths at different pH levels. They also defer in their susceptibility to iron replacement by competitive ions such as calcium or magnesium. Known in prior art are iron chelates such as Fe-Ethylene diamine tetra acetic acid (Fe-EDTA), Fe-Diethylene triamine penta acetic acid (Fe-DTPA) and Fe-ethylene diamine-N,N'-bis (2-hydroxyphenylacetic acid) (Fe-EDDHA). The stability of Fe-EDTA, Fe-DTPA and Fe-EDDHA varies according to pH. Fe EDTA is ineffective in alkaline soils and calcium rich soils or water. Moreover, Fe-EDTA gives only 12% Fe. Fe-DTPA is stable in pH levels of up to 7.0 and Fe-EDDHA is stable in pH levels up to 11.0 but is very expensive.

U.S. Pat. No. 3,917,475 relates to an ammonium phosphate fertilizer solution containing phosphate in the stable pyrophosphate and orthophosphate forms. The chelating ability of the solution is retained for long storage periods.

US20110098177 relates to a method of providing a metal to a plant to increase the marketable yield trait.

US20080293570 describes a Method of sequestering micronutrients to provide the micronutrients to a plant.

CA1283302 relates to stable suspension fertilizer compositions that include nitrogen compounds, at least one micronutrient and/or growth regulator/chelated iron.

Accordingly, there exist needs for a sequestered form of iron, which can give better concentrations of iron to meet the nutrient requirement in plants, thus overcoming the problems associated with nutrient deficiencies.

OBJECTS OF INVENTION

The primary object of the present invention is directed to provide a chelated fertilizer composition for agriculture/horticulture crops and plants.

It is another object of the present invention to provide a chelated fertilizer composition for enriching Iron (Fe) and Phosphorus (P) content in crops and plants through foliar application.

It is another object of the present invention to provide a method of preparing the chelated fertilizer composition.

It is another object of the present invention, wherein the chelated fertilizer composition is used to cure Fe and P deficiency in crops and plants, increase yield with more Fe and P content, thus reducing the risk of Fe and P deficiency in humans.

It is another object of the present invention, wherein sequestration of Fe is done using a chelating agent—disodium salt of Hydroxy Ethylidene Di Phosphonic Acid ($Na_2$ HEDP).

It is another object of the present invention, wherein chelation of Fe by disodium salt of Hydroxy Ethylidene Di Phosphonic Acid ($Na_2$ HEDP) developed 17% to 18% Fe-HEDP and 31% Phosphorus pentoxide ($P_2O_5$).

It is another object of the present invention, wherein the Fe chelate increases the yield and Fe concentration whereas $P_2O_5$ increases the yield and Phosphorus concentration of crops and plants.

It is another object of the present invention, wherein the final chelated fertilizer composition obtained is in powder form and is 100% water-soluble concentrate.

SUMMARY OF INVENTION

Thus according to the basic aspect of the present invention, there is provided a chelated fertilizer composition for use as a foliar fertilizer for enrichment of Iron (Fe) and Phosphorus (P) in crops and plants comprising:
 Iron (Fe) chelate; and
 Phosphorus pentoxide ($P_2O_5$),
  wherein the Iron chelate is Fe-Hydroxy Ethylidene Di Phosphonic Acid (HEDP), and
  wherein the chelated fertilizer composition is in powder form and is 100% water soluble concentrate.

A further aspect of the present invention is directed to provide a chelated fertilizer composition, wherein the fertilizer composition is prepared using compounds comprising:
 Chelating agent; and
 Ferric Oxide ($Fe_2O_3$),
  wherein the chelating agent is disodium salt of Hydroxy Ethylidene Di Phosphonic Acid ($Na_2$ HEDP).

It is another aspect of the present invention, wherein the Iron (Fe) chelate is obtained by sequestration of Iron (Fe) using the chelating agent.

It is another aspect of the present invention, wherein pH of the chelated fertilizer composition is between 6.5 and 7.5.

It is another aspect of the present invention, wherein the chelated fertilizer composition in powder form contains 17% to 18% Fe-HEDP and 31% $P_2O_5$ by weight of the composition.

A further aspect of the present invention is directed to provide a process for preparing the chelated fertilizer composition comprising the steps of:

Dissolving disodium salt of Hydroxy Ethylidene Di Phosphonic Acid (Na$_2$ HEDP) in water;

Heating the dissolved mixture up to 100° C. in a non-stick temperature controlled vessel/reactor;

Adding Ferric Oxide (Fe$_2$O$_3$) slowly and stirring to obtain mixture containing Fe-HEDP and P$_2$O$_5$;

Maintaining the temperature at 100° C. and stirring the mixture until liquid portion evaporates; and Drying the composition obtained using drier to secure moisture free powder composition containing 17% to 18% Fe-HEDP and 31% P$_2$O$_5$, wherein the chelated fertilizer composition in powder form is 100% water soluble concentrate.

It is another aspect of the present invention, wherein the Ferric Oxide and disodium salt of Hydroxy Ethylidene Di Phosphonic Acid is in the ratio of 1:2.

BRIEF DESCRIPTION OF THE FLOWCHART

Flowchart 1 illustrates the process for preparing the chelated fertilizer composition using Na$_2$ HEDP and Fe$_2$O$_3$.

DETAILED DESCRIPTION OF THE INVENTION WITH REFERENCE TO THE ACCOMPANYING FLOWCHART

The present invention relates to a chelated, fertilizer composition for agriculture/horticulture crops and plants and a method of preparing the chelated fertilizer composition. The present invention provides a chelated fertilizer composition for enriching Iron (Fe) and Phosphorus (P) content in crops and plants through foliar application. The fertilizer composition of the present invention is used in crops and plants to cure Fe and P deficiency, increase yield with more Fe and P content. The chelated fertilizer composition is beneficial for millets, greens, vegetables, sugarcane etc. This helps to reduce Fe and P deficiency in humans and thus is beneficial to humans by reducing the risk of anemia.

The sequestration of Fe is done using a chelating agent-disodium salt of Hydroxy Ethylidene Di Phosphonic Acid (Na$_2$ HEDP). The chelation of Fe by the method of the present invention helps to develop 17% to 18% Fe-HEDP and 31% Phosphorus pentoxide (P$_2$O$_5$). The Fe chelate increases the yield and Fe concentration of vital crops like maize, sugarcane, all millets, greens, cole crops and plants and P$_2$O$_5$ increases the yield and Phosphorus concentration.

The chelated fertilizer composition is obtained using compounds comprising chelating agent Na$_2$ HEDP and Fe$_2$O$_3$ (Ferric Oxide), heated at 100° C. to give 17% to 18% Fe-HEDP and 31% P$_2$O$_5$ in powder form as shown below. Fe$_2$O$_3$ and Na$_2$ HEDP are present in the ratio of 1:2. The chelated fertilizer composition thus obtained is highly soluble.

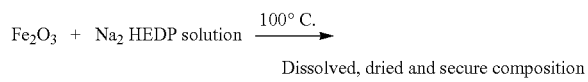

Dissolved, dried and secure composition

The process of preparing the chelated fertilizer composition as illustrated in flow chart 1 comprises dissolving 232 kg Na$_2$ HEDP in water. 232 kg Na$_2$ HEDP contains 105% of P$_2$O$_5$ The dissolved mixture is heated up to 100° C. in a non-stick temperature controlled vessel/reactor or open pan until a uniform solution is obtained. Further, 100 kg Fe$_2$O$_3$ containing 60% of Fe is slowly added and the mixture is stirred. During this process, the temperature is maintained at 100° C. and the mixture stirred for 4-5 hours until the liquid portion evaporates. The composition thus obtained is dried using mechanical/automatic drier to secure moisture free powder containing 17% to 18% Fe-HEDP and 31% P$_2$O$_5$. Chelation makes the composition completely soluble. The composition is analyzed and packed for market. The pH of the chelated fertilizer composition is between 6.5 and 7.5.

| 1.607 gm Fe | 5 gm HEDP 100%, |
|---|---|
| whereas, in prior art 1.607 gm Fe | 8.93 gm EDTA |

The method of preparing the chelated fertilizer composition is summarized as follows:

| HEDP 100% | 1.607 gm Fe | 5 gm |
|---|---|---|
| Na$_2$HEDP 80% | 1.607 gm Fe | 6.25 gm |
| 1.607 gm Fe | 6.25 gm Na$_2$HEDP | |
| 100 gm Fe | 388 gm Na$_2$ HEDP | |

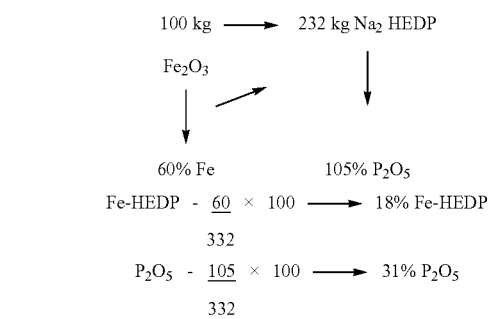

Various field experiments were conducted to study the effect of Fe-HEDP chelate on plants.

Experiment I:

Field experiments in maize crop were conducted using the composition of the present invention at Maize Research Centre, Hyderabad during kharif 2009. Six treatments and control treatment as below were used for yield evaluation.

T 1: GRIP (FeHEDP)—15% FeHEDP+27% P$_2$O$_5$–1 g/l of water

T 2: GRIP (Fe HEDP)—15% FeHEDP+27% P$_2$O$_5$–1 g/l of water

T 3: AGROFER—1 g/l of water

T 4: AGROFER—2 g/l of water

T 5: Fe EDTA-12%–1 g/l of water

T 6: Fe EDTA-12%–2 g/l of water

T 7: Control (Only recommended Fertilizer dose)

For all the six treatments, the composition of the present invention was used along with the recommended fertilizer dose (180-60-60 kg N—P$_2$O$_5$—K$_2$O/ha). The composition of the present invention (Fe-HEDP) was applied at three stages 20, 40 and 60 days after sowing. The crops were harvested in the month of November i.e. four months after sowing. Table 1, 2, 3 and 4 shows the effect of the six treatments and control treatment on stem grith, number of cobs, cobs yield and seed yield of maize crops.

TABLE 1

Stem girth (cm)

| Treatment | R1 | R2 | R3 | MEAN |
|---|---|---|---|---|
| GRIP 1 | 7.1 | 6.7 | 6.7 | 6.83 |
| GRIP 2 | 7.2 | 6.8 | 6.4 | 6.80 |
| AGROFER 1 | 6.9 | 6.6 | 6.6 | 6.70 |
| AGROFER 2 | 6.9 | 6.8 | 6.3 | 6.67 |
| Fe EDTA 1 | 6.6 | 6.4 | 6.6 | 6.53 |
| Fe EDTA 2 | 6.5 | 6.7 | 6.1 | 6.43 |
| Control | 6.4 | 6.2 | 6.3 | 6.30 |

TABLE 2

No. of cobs ('000 ha)

| Treatment | R1 | R2 | R3 | MEAN |
|---|---|---|---|---|
| GRIP 1 | 49.4 | 55.5 | 50.6 | 51.83 |
| GRIP 2 | 46.1 | 47.2 | 48.6 | 47.30 |
| AGROFER 1 | 46.5 | 47.0 | 41.2 | 44.90 |
| AGROFER 2 | 49.4 | 42.6 | 40.8 | 44.27 |
| Fe EDTA 1 | 38.8 | 40.5 | 41.2 | 40.17 |
| Fe EDTA 2 | 35.6 | 36.8 | 41.0 | 37.8 |
| Control | 35.8 | 34.2 | 39.8 | 36.60 |

TABLE 3

Cobs yield (kg/ha)

| Treatment | R1 | R2 | R3 | MEAN |
|---|---|---|---|---|
| GRIP 1 | 9855 | 8935 | 8650 | 8966.67 |
| GRIP 2 | 9125 | 8846 | 9585 | 9185.33 |
| AGROFER 1 | 8760 | 7300 | 8030 | 8030.00 |
| AGROFER 2 | 9125 | 8220 | 9490 | 8945.00 |
| Fe EDTA 1 | 6205 | 7855 | 8490 | 7516.67 |
| Fe EDTA 2 | 6935 | 8490 | 8200 | 7875.00 |
| Control | 7395 | 6760 | 7585 | 7246.67 |

TABLE 4

Seed yield (kg/ha)

| Treatment | R1 | R2 | R3 | MEAN |
|---|---|---|---|---|
| GRIP 1 | 6976.0 | 7280.0 | 6652.0 | 6969.33 |
| GRIP 2 | 7407.0 | 6828.0 | 7652.0 | 7295.67 |
| AGROFER 1 | 5378.0 | 5536.0 | 6290.0 | 5734.67 |
| AGROFER 2 | 5076.0 | 5857.0 | 6560.0 | 5831.00 |
| Fe EDTA 1 | 5022.0 | 5863.0 | 6448.0 | 5777.67 |
| Fe EDTA 2 | 4355.0 | 5676.0 | 7633.0 | 5888.00 |
| Control | 4373.0 | 5680.0 | 6420.0 | 5491.00 |

Experiment II:

Field Experiment in rice crops were conducted using the composition of the present invention by RAHE Foundation. Five treatments including control treatment as below were used for yield evaluation.

T1—2 gm Grip (Fe-HEDP) in 1 liter of water
T2—3 gm Grip (Fe-HEDP) in 1 liter of water
T3—2 gm Agrofer Iron Chelate in 1 liter of water
T4—3 gm Agrofer Iron Chelate in 1 liter of water
T5—Control
Grip (Fe-HEDP)—Yielding 15% to 18% Chelated iron and 27% to 31% wholesome $P_2O_5$.

The crops were subjected to foliar spray 20 and 50 days after planting. Table 5 shows the grain yield in rice plant for the above five treatments.

TABLE 5

Grain Yield (Kg/ha)

| Treatments | R1 | R2 | R3 | Total | Mean |
|---|---|---|---|---|---|
| T1 | 5917 | 5500 | 5834 | 17251 | 5750 |
| T2 | 5084 | 5292 | 5250 | 15626 | 5207 |
| T3 | 5417 | 5250 | 4833 | 15500 | 5167 |
| T4 | 4584 | 5167 | 5167 | 14918 | 4973 |
| T5 | 5084 | 5750 | 4834 | 15668 | 5223 |

Among the various forms of chemicals tried, between Grip and Agrofer, the Grip had more response to grain yield than Agrofer because of phosphorus with iron content in the Grip. This is more useful than Agrofer containing only Chelated iron to which rice did not show higher response. The Grip containing Fe-HEDP and phosphorus were efficient in the conversation of ratio of grain to that of biomass.

It was thus concluded that foliar spray of Grip either 2 gm or 3 gram dissolved in 1 liter of water and sprayed 20 and 50 days after planting enhanced the grain yield of rice by 15.6% than the unsprayed control.

The present invention may be embodied in other specific forms without departing from its spirit or essential characteristics. The described embodiments are to be considered in all respects only as illustrative and not restrictive.

The details of the invention, its object and advantages explained hereinbefore is to be understood that the invention, as fully described herein is not intended to be limited by the objects mentioned herein.

I claim:

1. A process for preparing a chelated fertilizer composition comprising the steps of:
   dissolving disodium salt of Hydroxy Ethylidene Di Phosphonic Acid ($Na_2$ HEDP) in water;
   heating the dissolved mixture up to 100° C. in a non-stick temperature controlled vessel/reactor;
   adding Ferric Oxide ($Fe_2O_3$) and stirring to obtain mixture containing Fe-HEDP and $P_2O_5$;
   maintaining the temperature at 100° C. and stirring the mixture until liquid portion evaporates; and
   drying a composition obtained using drier to secure moisture free powder composition containing 17% to 18% Fe-HEDP and 31% $P_2O_5$,
   wherein the chelated fertilizer composition in powder form is 100% water soluble concentrate.

2. The process as claimed in claim 1, wherein the Ferric Oxide and disodium salt of Hydroxy Ethylidene Di Phosphonic Acid is in a weight ratio of 1:2.

* * * * *